UNITED STATES PATENT OFFICE 2,411,611

MANUFACTURE OF N-(POLYHYDROXY-ALKYL)-ARYLAMINES

Franz Bergel, Aaron Cohen, and John Wynne Haworth, Welwyn Garden City, England, assignors, by mesne assignments, to Hoffmann-La Roche Inc., Nutley, N. J., a corporation of New Jersey No Drawing. Application March 4, 1942, Serial No. 433,341. In Great Britain May 20, 1941

5 Claims. (Cl. 260—211)

The synthesis of N-(polyhydroxyalkyl)-arylamines, such as arabityl or ribityl xylidines, is described in the literature (cf. R. Kuhn, Berichte der deutschen chemischen Gesellschaft, 1935, 68, 1282 and 1765; P. Karrer, Helvetica Chimica Acta, 1935, 18, 522 and 1130; 1936, 19, 264). Its main feature is the formation of a condensation product between a sugar and the arylamine and the subsequent or concurrent hydrogenation to the saturated compound.

The present invention provides a process which avoids the use of the sometimes difficultly accessible sugars but employs the arylamides of the more readily available sugar acids of the general formula I, in which the substituents R and R' are hydrogen or identical or different alkyl groups and in which $x$ is 3 or 4. Such arylamides may be obtained in known manner by the interaction of the corresponding arylamine with an ester or lactone or with the acids themselves which readily form the lactones. According to the invention the amide is treated with an acylating agent to form the corresponding acyl compound (II), the acyl compound is treated with a halogenating agent to form the corresponding chloroimine (III) and the latter is reduced with hydrogen in the presence of a hydrogenation catalyst to form the corresponding N-(polyacyloxyalkyl)-arylamine (IV) which finally is hydrolysed to form the N-(polyhydroxyalkyl)-arylamine (V).

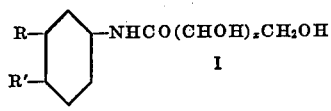

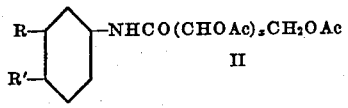

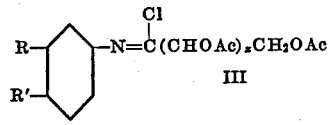

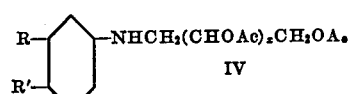

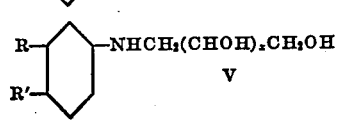

The N-(polyhydroxyalkyl)-arylamines are used as intermediates in the preparation of valuable pharmaceutical substances.

The following examples in which the parts are by weight illustrate how the process of the invention may be carried into effect:—

1. Preparation of N-(d-arabityl)-aniline (a) d-Arabonic acid anilide is prepared in any convenient manner, for example by heating d-arabonic acid lactone with aniline, as described by Th. W. J. van Marle (Rec. trav. chim. Pays-Bas, 1920, 39, 549–72), for the corresponding l-compound, or by heating the lactone with aniline in the presence of dilute acetic acid.

Alternatively the d-arabonic acid anilide may be prepared from methyl d-arabonate: A mixture of 28.5 parts of methyl d-arabonate and 15 parts of aniline are heated on the waterbath. The warm liquid mixture solidifies after 45 minutes, when 20 parts of methanol are added and the heating continued for another 2 hours, while the methanol evaporates. The solid mass is triturated with 50 parts of absolute alcohol and well pressed on a filter. The crude anilide is recrystallised from 75% alcohol and has a melting-point of 198° C. In order to increase the yield, the mother liquors are concentrated and another 5 parts of aniline added. The heating is continued for several hours and the product isolated in the same way as above.

(b) 7.5 parts of the above d-arabonic acid anilide are acetylated by adding the same to a solution of 3 parts of zinc chloride in 50 parts of acetic anhydride, which is cooled in ice. After being kept at 0° C. for 1 hour, the mixture is allowed to stand at room temperature for 24 hours and poured into water, precipitating tetra-acetyl-d-arabonic acid anilide, which crystallises from alcohol in colourless needles, melting point 161° C.

(c) A suspension of 4.09 parts of finely powdered tetra-acetyl-d-arabonicacid anilide and 2.08 parts of powdered phosphorus pentachloride in 50 parts of dry toluene is heated on the water bath for 1 hour. Hydrogen chloride is evolved. The toluene and phosphorus oxychloride are removed under reduced pressure. The residual oil is dissolved in ether, filtered clear, concentrated, and light petroleum (boiling point 40–60° C.) is added to the concentrate. On cooling, the corresponding chloroimine (III, where R=R'=H) separates in colourless needles of melting point 102° C.

(d) Catalytic hydrogenation of the above chloroimine is carried out by shaking a solution of 1.5 parts of the chloroimine in 40 parts of dry ethyl acetate with hydrogen in the presence of 0.2 part of 25% palladised charcoal and 0.2 part of platinum oxide and 0.3 part of anhydrous sodium acetate. When the hydrogen uptake is complete, the solution is filtered, evaporated to dryness, and the residual basic material crystallised from aqueous methyl alcohol, from which N-(tetra-acetyl-d-arabityl)-aniline

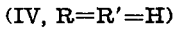

separates in colourless plates, melting point 75–76° C.

(e) 1.7 parts of the last mentioned tetra-acetyl compound are mixed with a solution of 6 parts of crystalline barium hydroxide in 100 parts of water and refluxed for three-quarters of an hour. The excess of barium hydroxide is precipitated as carbonate from the resulting solution by the passage of carbon dioxide. After filtering, the clear solution is evaporated to dryness under reduced pressure. The product is extracted from the residue by boiling alcohol, which is then filtered hot. On cooling the alcoholic extracts, N-(d-arabityl)-aniline separates in colourless needles, melting point 157–159° C.

2. Preparation of N-(d-arabityl)-toluidine (a) d-Arabonic acid-p-toluidide is prepared in any convenient manner. For example, a mixture of 8 parts of d-arabonic acid lactone, 10 parts of p-toluidine, 80 parts of water and 10 parts of acetic acid is heated on the water bath for 24 hours in an open vessel. A solid mass is formed which is triturated with alcohol, filtered and washed with ether, yielding d-arabonic acid-p-toluidide, which crystallises from alcohol in colourless needles, melting point 199–200° C.

(b) 7.3 parts of the above d-arabonic acid-p-toluidide are acetylated by adding the same to a solution of 3 parts of zinc chloride in 45 parts of acetic anhydride, which is cooled in ice. After being kept at 0° C. for 1 hour, the mixture is allowed to stand at room temperature overnight and poured into water, precipitating tetra-acetyl-d-arabonic acid-p-toluidide, which crystallises from alcohol in colourless needles, melting point 167–168° C.

(c) A suspension of 4 parts of finely powdered tetra-acetyl-d-arabonic acid-p-toluidide and 2 parts of phosphorus pentachloride in 30 parts of dry toluene is heated on the water bath for 1 hour. Hydrogen chloride is evolved. The toluene and phosphorus oxychloride are removed under reduced pressure. The residue is extracted with dry ether, which leaves a small portion of unchanged tetra-acetyl-d-arabonic acid-p-toluidide behind. The filtered ethereal solution is concentrated and light petroleum (boiling point 40–60° C.) is added until the mixture is turbid. On cooling, the corresponding chloroimine (III, where R=H and R'=CH₃) separates in colourless needles, melting point 82° C.

(d) Catalytic hydrogenation of the above chloroimine is carried out by shaking a solution of 1.6 parts of the chloroimine in 30 parts of ethyl acetate with hydrogen in the presence of 0.05 part of 25% palladised charcoal and 0.1 part of platinum oxide and 0.3 part of anhydrous sodium acetate. When the hydrogen uptake is complete, the solution is filtered, evaporated to dryness and the residual basic material crystallised from a small amount of methanol, yielding N-(tetra-acetyl - d - arabityl) - p - toluidine (IV, R=H, R'=CH₃). It separates in colourless needles, melting point 72° C.

(e) 2.5 parts of the last mentioned tetra-acetyl compound are mixed with a solution of 7 parts of crystalline barium hydroxide in 150 parts of water and refluxed for three-quarters of an hour. The excess of barium hydroxide is precipitated as carbonate from the resulting solution by the passage of carbon dioxide. After filtering, the clear solution is evaporated to dryness under reduced pressure. The product is extracted from the residue by boiling alcohol, which is then filtered hot. On cooling the alcoholic extracts, N-(d-arabityl)-p-toluidine separates in colourless needles, melting point 179° C.

3. Preparation of N-(d-ribityl)-p-toluidine (a) d-Ribonic acid-p-toluidide is prepared in any convenient manner. For example, a mixture of 10 parts of d-ribonic acid lactone and 12 parts of p-toluidine, 100 parts of water, and 10 parts of glacial acetic acid is heated on the water bath overnight in an open vessel. A solid mass is formed, which is recrystallised from butyl alcohol, yielding d-ribonic acid-p-toluidide, which forms colourless needles, melting point 157–158° C. In order to increase the yield, the butyl alcohol mother liquors are evaporated to dryness and the residue heated for a further 24 hours, and the product isolated as above.

(b) 10 parts of the above d-ribonic acid-p-toluidide are acetylated by adding the same to a solution of 4 parts of zinc chloride in 60 parts of acetic acid anhydride, which is cooled in ice. After being kept at 0° C. for an hour, the mixture is allowed to stand at room temperature overnight and poured into water, precipitating tetra-acetyl-d-ribonic acid-p-toluidide, which crystallises from alcohol in colourless needles, melting point 120–121° C.

(c) Suspension of 12 parts of finely powdered tetra-acetyl-d-ribonic acid-p-toluidide and 7 parts of powdered phosphorus pentachloride in 50 parts of dry toluene is heated gently on the water bath for 1½ hours. The toluene and phosphorus oxychloride are removed under reduced pressure, finally at 0.2 mm. 50 parts of toluene are again added to the residue and the evaporation is repeated under reduced pressure. The final residue is dissolved in 60 parts of hot petroleum ether (boiling point 100–120° C.), the solution is filtered and the solvent evaporated under reduced pressure. A further portion of toluene is added and the evaporation repeated once more to remove the last traces of phosphorus oxychloride. The desired chloroimine is obtained as a pale yellow oil.

(d) Catalytic hydrogenation of the above chloroimine is carried out by shaking 9 parts of the chloroimine in 100 parts of dry ethyl acetate with hydrogen in the presence of 0.8 part of 25% palladised charcoal and 0.1 part of platinum oxide and 5 parts of anhydrous sodium acetate. The hydrogen uptake is sometimes slow at first but can be speeded up by addition of a few drops of palladous chloride solution. When the hydrogen uptake is complete, the ethyl acetate solution is filtered and extracted several times with dilute hydrochloric acid. The acid layer is made alkaline with sodium carbonate solution, and the basic material extracted with ether. The ether is dried over sodium sulphate and evaporated, leaving N-(tetra-acetyl-d-ribityl)-p-toluidine as a yellow oil.

(e) 1 part of the last mentioned tetra-acetyl compound is mixed with a solution of 3 parts of crystalline barium hydroxide in 50 parts of water and boiled under reflux for half an hour. The excess of barium hydroxide is precipitated as carbonate from the resulting solution by the passage of carbon dioxide. After filtering, the clear solution is evaporated to dryness under reduced pressure. The product is extracted from the residue by boiling alcohol, which is then filtered hot. On cooling the alcoholic extracts, N-(d-ribityl)-p-toluidine separates in colourless needles, which, after recrystallisation from alcohol, has a melting point 140–141° C.

4. Preparation of N-(d-ribityl)-3:4-dimethylaniline (a) d-Ribonic acid-3:4-dimethyl-anilide is prepared in any convenient manner. For example, a mixture of 5 parts of d-ribonic acid lactone and 5 parts of 3:4-dimethylaniline is heated on the water bath overnight. A solid is formed, which is triturated with hot butyl alcohol. After cooling, the product which is d-ribonic acid-3:4-dimethylanilide is filtered off. It crystallises from butyl alcohol in colourless needles, melting point 162–163° C.

(b) 10 parts of the above d-ribonic acid-3:4-dimethylanilide are acetylated by adding the same to 4 parts of zinc chloride in 65 parts of acetic anhydride, which is cooled in ice. After being kept at 0° C. for 1 hour, the mixture is allowed to stand at room temperature for 24 hours and poured into water, precipitating tetra-acetyl-d-ribonic acid-3:4-dimethylanilide, which crystallises from alcohol in colourless needles, melting point 114–115° C.

(c) A suspension of 10 parts of finely powdered tetra-acetyl-d-ribonic acid-3:4-dimethylanilide and 5.5 parts of powdered phosphorus pentachloride in 50 parts of dry toluene is heated on the water bath at about 50° C. for 1 hour. The toluene and phosphorus oxychloride are removed under reduced pressure, a further 50 parts of toluene added and the evaporation repeated. The residue is taken up in 50 parts of hot petroleum ether (boiling point 100–120° C.), the solution is filtered, and the organic solvent removed under reduced pressure. The chloroimine remains as an oil which solidifies on cooling and may be crystallised from a mixture of ether and petroleum ether, from which it separates in colourless needles, melting point 62° C.

(d) Catalytic hydrogenation of the above crude chloroimine is carried out by shaking a solution of 9.3 parts of the chloroimine in 150 parts of dry ethyl acetate with hydrogen in the presence of 0.8 part of 25% palladised charcoal or 1.5 parts of 10% palladised charcoal and 5 parts of anhydrous sodium acetate. The hydrogenation can be accelerated if desired by the addition of more dry ethyl acetate. When the hydrogen uptake is complete, the solution is filtered, evaporated to dryness, the residue taken up in dilute hydrochloric acid and non-basic material removed by extraction with ether. The aqueous solution is made alkaline with sodium carbonate solution, when the N-(tetra-acetyl-d-ribityl)-3:4-dimethyl-aniline separates as an oil, which quickly solidifies. This is extracted with ether the extract washed with water, and dried. The solvent is removed and the residue on cooling forms a solid crystalline mass, which after recrystallisation from methyl alcohol has a melting point 98–99° C. This product is N-(tetra-acetyl-d-ribityl)-3:4-dimethylanilide.

(e) 4.5 parts of the above mentioned tetra-acetyl compound are hydrolysed by mixing with a solution of 12 parts of crystalline barium hydroxide in 200 parts of water and refluxing for three-quarters of an hour or by dissolving in 9 parts of methanol, adding 1.8 parts of sodium hydroxide in 22.5 parts of water and heating the mixture on the water bath for half an hour, during which time some of the methanol distils off. In the first case, the excess of barium hydroxide is precipitated from the resulting solution by the passage of carbon dioxide and filtered hot. In both cases, on cooling, the N-(d-ribityl)-3:4-dimethyl-aniline separates in colourless plates, melting point 141–143° C., which is identical in every respect with the same compound synthesised by P. Karrer (Helvetica Chimica Acta, 1935, 18, 1130).

We claim:

1. A process for the manufacture of N-(polyhydroxyalkyl) arylamines, which comprises acetylating an anilide of a sugar acid of the general formula

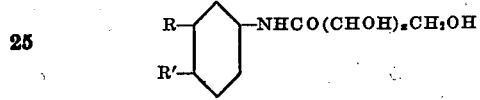

wherein $x$ is selected from the integers 3 and 4 and R and R' each represent a radical selected from the group consisting of hydrogen and a lower alkyl radical, to form the corresponding acetate, chlorinating the acetate with phosphorous pentachloride to form the corresponding N-(polyacyloxyalkyl)-arylamine, and hydrolyzing this compound with a non-oxidizing hydrolyzing agent to form the N-(polyhydroxyalkyl)-arylamine.

2. A process for the manufacture of N-(d-ribityl)-p-toluidine which comprises acetylating d-ribonic acid-p-toluidide with acetic anhydride in the presence of zinc chloride to form the corresponding acetate, chlorinating the acetate with phosphorous pentachloride to form the corresponding chloroimine, hydrogenating the chloroimine with hydrogen in the presence of palladized charcoal and platinum oxide as catalysts, and hydrolyzing the resulting compound in an aqueous solution of barium hydroxide to form the N-(d-ribityl)-p-toluidine.

3. A process for the manufacture of N-(d-ribityl)-3 : 4 - dimethylaniline which comprises acetylating d-ribonic acid-3:4-dimethyl-aniline with acetic anhydride in the presence of zinc chloride to form the corresponding acetate, chlorinating the acetate with phosphorous pentachloride to form the corresponding chloroimine, hydrogenating the chloroimine with hydrogen in the presence of palladized charcoal as catalyst and hydrolyzing the resulting compound with aqueous solution of barium hydroxide to form the corresponding N-(d-ribityl)-3:4-dimethyl-aniline.

4. A process which comprises acetylating d-ribonic acid-3:4-dimethylaniline with acetic anhydride to form the corresponding acetate, chlorinating the acetate with phosphorous pentachloride to form the corresponding chloroimine and hydrogenating the chloroimine with hydrogen in the presence of a noble metal hydrogenation catalyst, to form the corresponding N-(tetra-acetyl-d-ribityl)-3:4-dimethylaniline.

5. 3,4-dimethyl-N-tetraacylribonyl-aniline.

FRANZ BERGEL.
AARON COHEN.
JOHN WYNNE HAWORTH.